(12) United States Patent
Nelson

(10) Patent No.: US 6,560,918 B2
(45) Date of Patent: May 13, 2003

(54) INSECT TRAP

(75) Inventor: Thomas Dean Nelson, Maplewood, MN (US)

(73) Assignee: Ecolab Inc., St. Paul, MN (US)

(*) Notice: Subject to any disclaimer, the term of this patent is extended or adjusted under 35 U.S.C. 154(b) by 0 days.

(21) Appl. No.: 09/961,795

(22) Filed: Sep. 24, 2001

(65) Prior Publication Data

US 2003/0056426 A1 Mar. 27, 2003

(51) Int. Cl.[7] .................... A01M 1/04; A01M 1/14; A01M 1/22
(52) U.S. Cl. .................. 43/112; 43/113; 43/114
(58) Field of Search .................... 43/112, 113, 114

(56) References Cited

U.S. PATENT DOCUMENTS

| | | | | |
|---|---|---|---|---|
| 1,848,614 A | * | 3/1932 | Folmer et al. | 43/112 |
| 1,936,468 A | * | 11/1933 | Folmer et al. | 43/112 |
| 1,986,361 A | * | 1/1935 | Rovinsky | 43/112 |
| 2,038,495 A | * | 4/1936 | Keller | 43/112 |
| 3,346,988 A | * | 10/1967 | Pickering | 43/112 |
| 3,464,144 A | * | 9/1969 | Kannett | 43/112 |
| 3,491,478 A | * | 1/1970 | Gilbert | 43/112 |
| 3,894,351 A | * | 7/1975 | Iannini | 43/112 |
| 3,986,292 A | * | 10/1976 | Klebanoff | 43/112 |
| 3,998,000 A | * | 12/1976 | Gilbert | 43/112 |
| 4,121,371 A | * | 10/1978 | Kaphengst et al. | 43/112 |
| 4,182,069 A | * | 1/1980 | De Yoreo | 43/112 |
| 4,603,505 A | * | 8/1986 | Millard | 43/112 |
| 4,696,126 A | * | 9/1987 | Grothaus et al. | 43/112 |
| 4,959,923 A | * | 10/1990 | Aiello et al. | 43/112 |
| 5,269,091 A | * | 12/1993 | Johnson et al. | 43/112 |
| 6,032,406 A | * | 3/2000 | Howse et al. | 43/112 |
| 6,050,025 A | * | 4/2000 | Wilbanks | 43/112 |
| 6,108,965 A | * | 8/2000 | Burrows et al. | 43/113 |
| 6,108,966 A | * | 8/2000 | Otomo et al. | 43/113 |
| 6,134,826 A | * | 10/2000 | Mah | 43/112 |
| 6,195,932 B1 | * | 3/2001 | Aicher | 43/112 |

FOREIGN PATENT DOCUMENTS

| | | | |
|---|---|---|---|
| CA | 656202 B1 | * | 1/1963 |
| FR | 2775159 B1 | * | 8/1999 |
| GB | 2242323 A1 | * | 9/1991 |
| JP | 52-141358 B1 | * | 11/1977 |
| JP | 52-141359 B1 | * | 11/1977 |
| JP | 54-66271 B1 | * | 5/1979 |
| WO | WO-79/00574 A1 | * | 8/1979 |

OTHER PUBLICATIONS

Insect–O–Cutor® Flying Insect Elimination Systems Brochure, 2000, 2 pages.
Gilbert® Professional Flytraps Magazine, Mar. 2000, 19 pages.
Electrocuting and Elctronic Insect Traps: Trapping Efficiency and Production of Airborne Particles, Alberto B. Broce, Jun. 1999, 12 pages.

* cited by examiner

*Primary Examiner*—Darren W. Ark
(74) *Attorney, Agent, or Firm*—IPLM Group, P.A.

(57) ABSTRACT

An insect trap (10) is operable in either an electrocuting mode or non-electrocuting mode. Further, an integral grid tester (96) is used to test whether or not power is being supplied to the grid (40).

13 Claims, 5 Drawing Sheets

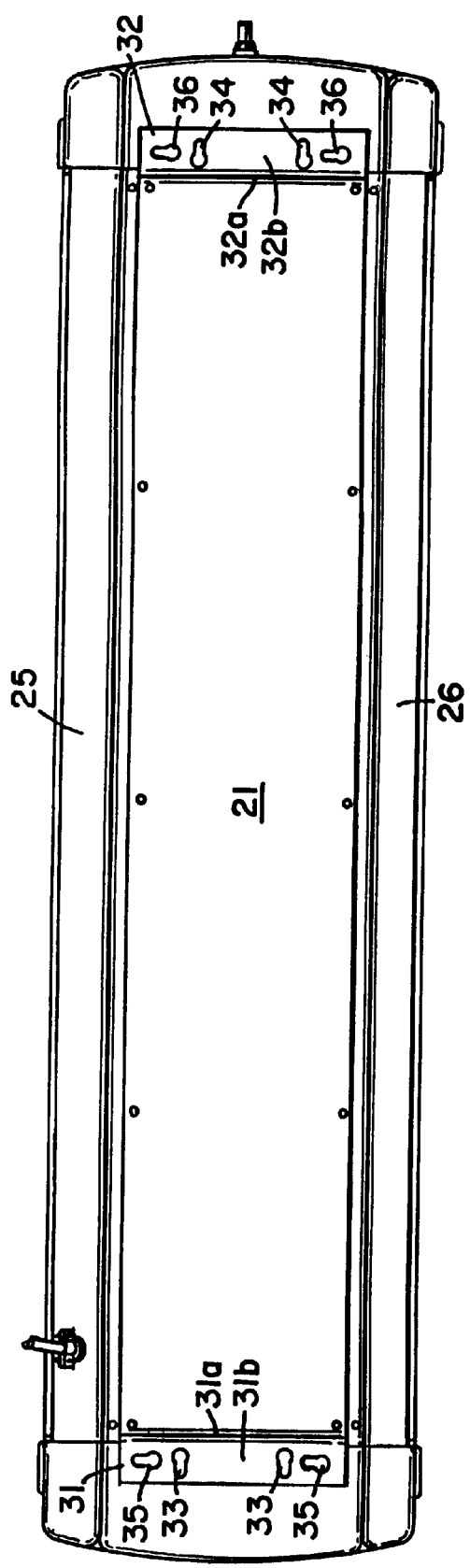

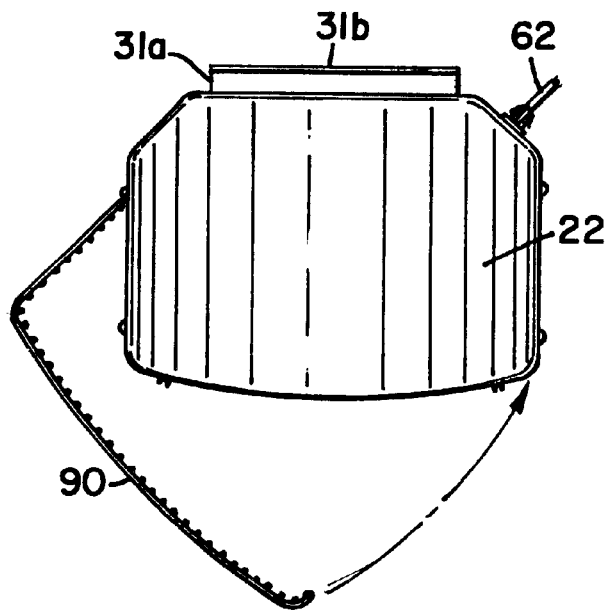
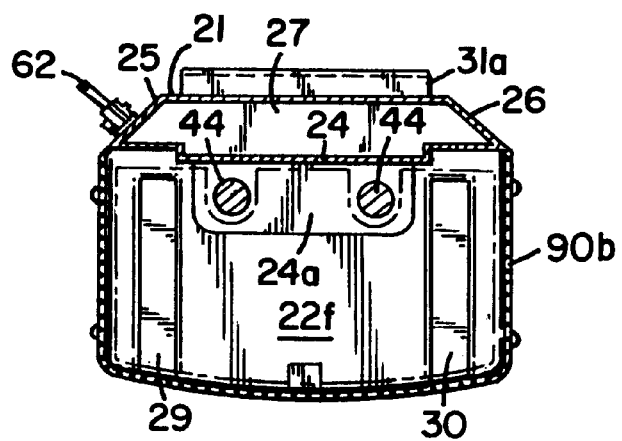
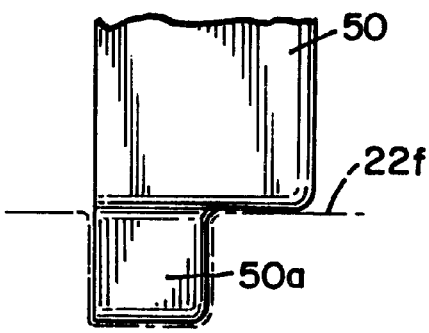

INSECT TRAP

BACKGROUND OF THE INVENTION

1. Field of the Invention

This invention relates generally to a fly and insect trap and more particularly to an insect trap that has two modes of use and they also incorporate an integral grid tester.

2. Description of the Prior Art

There are numerous types of flying insect traps that use a light source as an attractant. High voltage electrocuting systems have also been utilized with such traps. One of the major objections to the operation of electrocuting insect traps in premises where food is handled is the production of insect parts as they are disintegrated by the high voltage of the electrified grids. These insect particles are potential allergens. Insect scales, hairs and body parts have been demonstrated to cause a variety of respiratory conditions. Therefore, in some instances, the use of electrocuting traps are not desired.

Another type of trap is a trap that uses an attractant, such as a light. Incorporated into these insect traps are adhesive boards which will utilize a non-toxic adhesive to trap the insects that have been attracted by the light.

However, to date, a user has had to choose between the two and has not had the option of using a single trap that can be used in either or both modes. Therefore, it is necessary to sometimes purchase two separate traps. Also, when utilizing an electrocuting trap, there is always the question by the user of whether or not the grid is operational. Various ways to test this include spraying a mist across the grid or taking an insulated device, such as a screwdriver, and touching the grid to get a spark.

The present invention addresses the problems associated with the prior art and provides for a dual mode flying insect trap and also an insect trap having an integral grid tester.

SUMMARY OF THE INVENTION

In one embodiment, the invention is a dual mode insect trap having a housing and an insect electrocuting grid positioned inside of the housing. A grid transformer is operatively connected to the insect electrocuting grid. A power cord is provided for connecting the trap to a source of power. The grid transformer is operatively connected to the power cord. A lamp is positioned in the housing and is operatively connected to the power cord. An insect collection tray is positioned in the housing. A switch is connected between the grid transformer and the source of power, wherein in a first position the power source is connected to the grid and in a second position, power is disconnected to the grid. In both the first and second positions, the lamp is connected to the power source. The insect collection tray is adapted and configured to receive an adhesive sheet, wherein the trap is operable as an electrocuting insect trap when the switch is in the first position and a non-electrocuting insect trap when the trap is in the second position.

In another embodiment, the invention is an insect trap having a housing and an insect electrocuting grid positioned in the housing. A grid transformer is operatively connected to the insect electrocuting grid and a power cord connects the trap to a source of power. A grid transformer is operatively connected to the power cord. A lamp is positioned in the housing and operatively connected to the power cord. An integrated grid tester includes a contact moveable between a first, unengaged position and a second, engaged position, wherein when in the engaged position, the contact touches the grid. An indicator is operatively connected to the contact, wherein when the contact is in the engaged position, the indicator signals the grid is operational.

BRIEF DESCRIPTION OF THE DRAWINGS

FIG. 3 is a rear elevational view of the insect trap shown in FIG. 1;

FIG. 4 is a top plan view of the insect trap shown in FIG. 2, with the door in an open position;

FIG. 5 is a cross-sectional view taken generally along the lines 5—5 of FIG. 2;

FIG. 6 is an enlarged side elevational view of a portion of the tray shown in FIG. 1.

DETAILED DESCRIPTION OF THE PREFERRED EMBODIMENT

Figure 1:
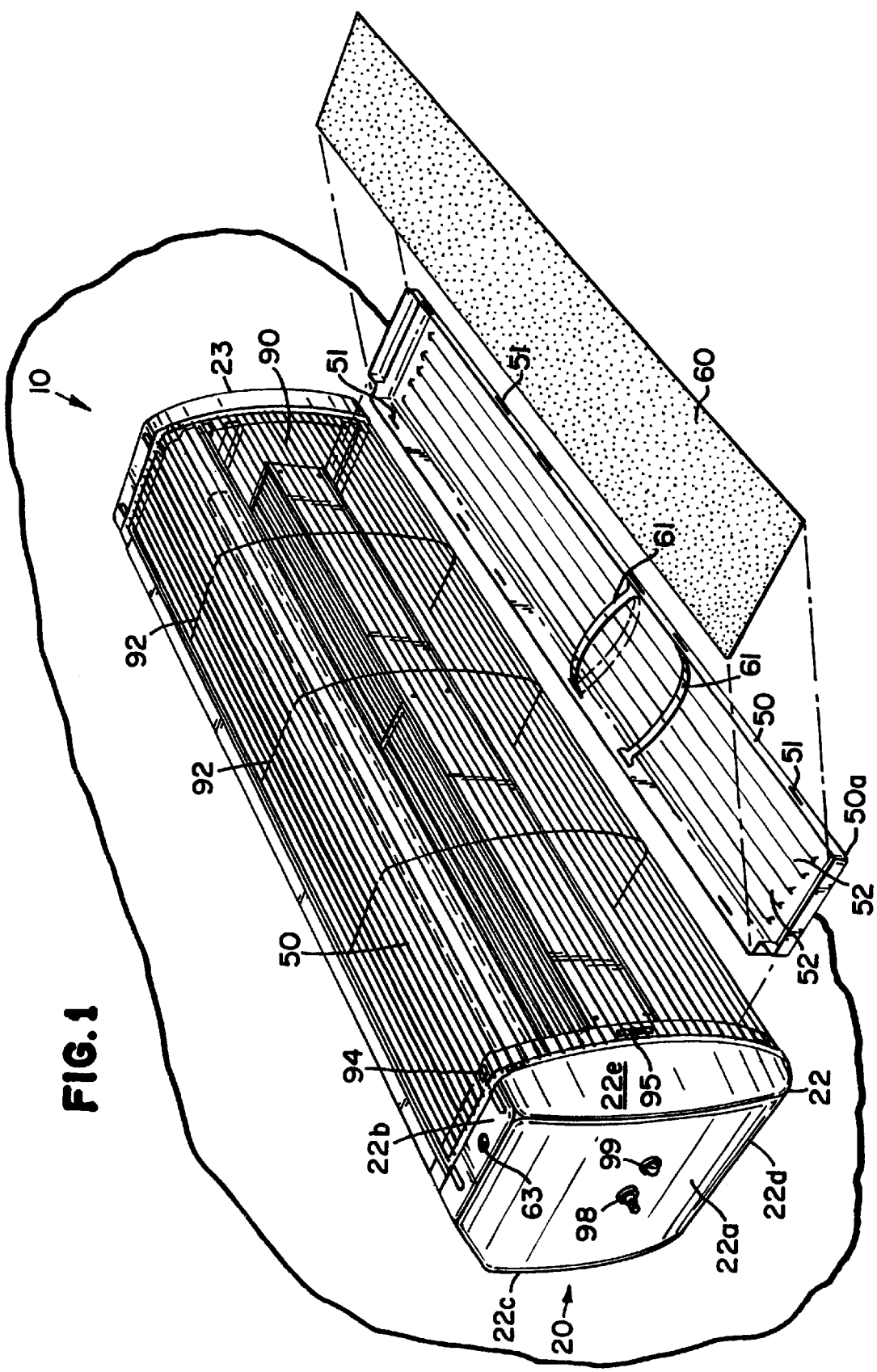
FIG. 1 is a perspective view of the insect trap of the present invention, with some parts exploded away, in a horizontal orientation.

Referring to the drawings, wherein like numerals represent like parts throughout the several views, there is generally disclosed at 10 a flying insect trap. The insect trap 10 includes a housing generally designated at 20. The housing 20 includes a back wall member 21 that extends along the length of the trap 10. The back wall member 21 is positioned between first end cap 22 and second end cap 23. The end caps are made of suitable material such as a durable plastic. The back wall member 21 is operatively connected to an intermediate wall 24 by side walls 25, 26. Preferably, the back wall member 21, intermediate wall 24 and side walls 25, 26 are formed of suitable material such as stainless steel sheet metal. A cavity 27 is formed between the back wall member 21 and walls 24–26. The back wall member 21, intermediate wall 24 and side walls 25, 26 are suitably connected to the end caps 22, 23 by suitable means such as nuts and bolts (not shown).

The end caps 22, 23 are substantially mirror images of each other and only one will therefore be described in detail. The end cap 22 has an outer wall 22a connected to an inner wall 22f by four side walls 24b–24e. A ridge or indentation is formed along the top of the side walls 22b, 22d, 22e to provide for a stop for the fence, as will be described more fully hereafter. A first slot 29 is formed proximate the side wall 22b and a second slot 30 is formed proximate the side wall 22d. Both slots 29, 30 extend all the way to the side wall 22e.

An electrocuting grid 40, as is well known in the art, is supported off of the intermediate wall 24. The electrocuting grid 40 comprises a plurality of spaced wires 41. The wires 41 are supported by three stand-offs 42 which are in turn secured to the intermediate wall 24 by means well known in the art. The stand-offs 42 may have flanges at their bottoms which are in turn secured by screws, bolts and nuts or other suitable means. A rectangular plastic cover 43 is positioned over the wires 41 and is secured to the stand-offs 42 by suitable means, well known in the art.

The intermediate wall 24 has flanges 24a formed at both ends. The flanges 24a are 90 degrees to the intermediate wall 24. On the flanges 24a are mounted lamp sockets (not shown) into which are inserted two insect attractant lights 44 such as fluorescent lamps, or other lights well known in the art.

Elongate trays 50 may be utilized for the trap 10. The trays themselves will be described in detail here and the varied uses described hereafter. The trays 50 extend the length between the end caps 22, 23. The trays 50 are relatively shallow and have a depth of approximately two inches. They are in the general shape of an open-topped rectangular parallelepiped. Along both edges are formed slots 51 at spaced intervals. A plurality of elongate raised surfaces 52 are formed along the bottom of the tray 50 to make removal of the adhesive sheet 60 easier and to provide rigidity. A non-toxic adhesive sheet 60 is rectangular in shape and is sized to be placed in to the tray 50. Flexible metallic strips 61 are utilized to hold the adhesive paper 60 in position. The adhesive sheet 60 is first placed on the elongate raised surfaces 52. Then the metal strips 61 are placed inside of the slots 51. At that time, they are curved upward as is shown by the top strip 61 in FIG. 1. Then, the middle of the strips 61 are pressed down and they flex in an opposite direction as shown in the lower strip 61 in FIG. 1. This holds the paper 60 in place, although it is understood the other suitable methods may also be used. As shown in FIG. 6, which is a side elevational view of a portion of the tray 50, the tray 50 has an end section 50*a* that is not as deep as the rest of the tray 50. That is, the end section 50*a* is approximately one inch in depth as opposed to the two inches in depth of the tray 50. The end section 50*a* of the tray 50 is configured to be positioned within slots 29 in end caps 22, 23 and/or slots 30 in end caps 22, 23.

Figure 7:
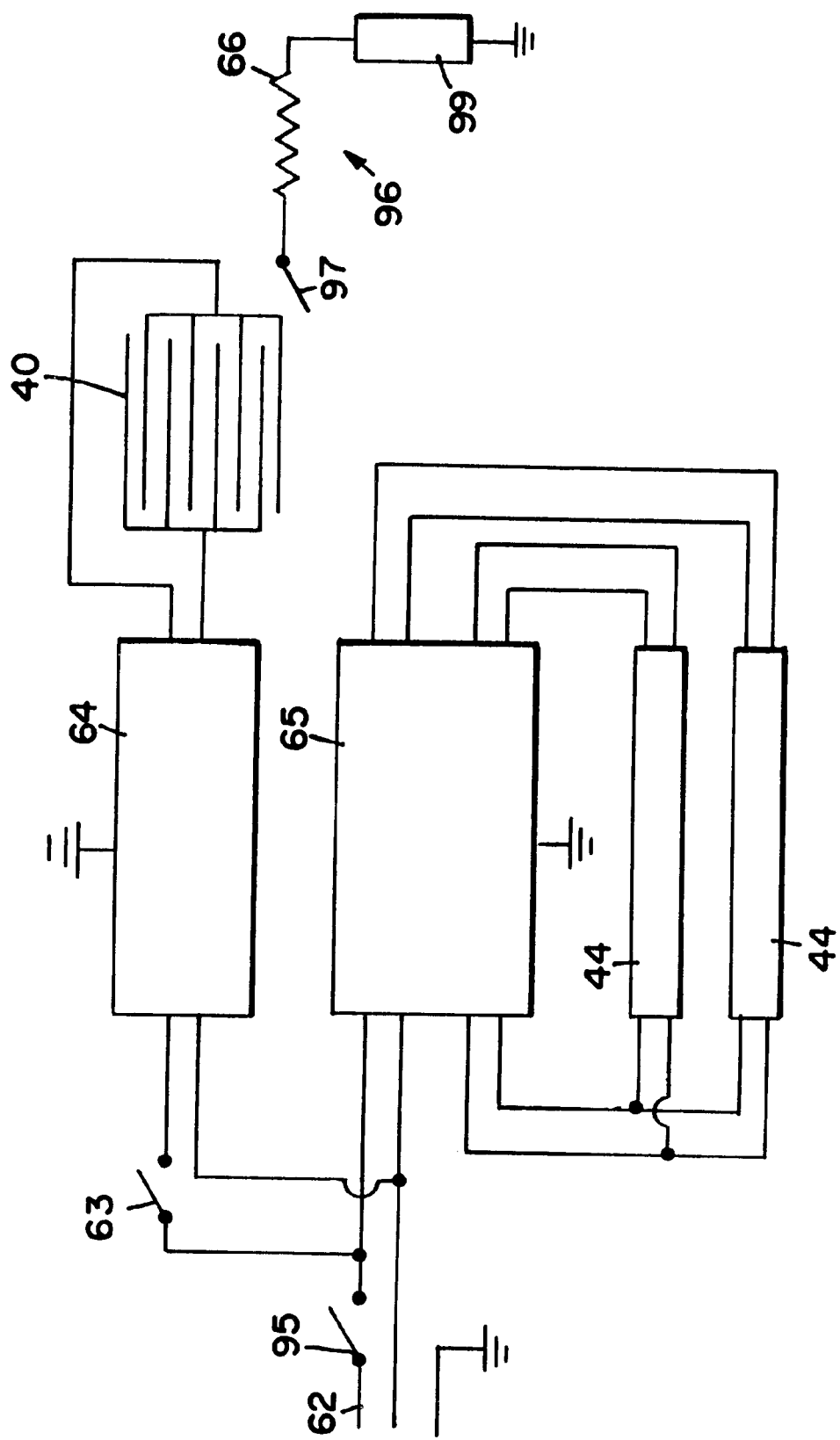
FIG. 7 is an electrical schematic of the insect trap shown in FIG. 1.

A wire fence 90, forming a cover that allows insects to pass through while protecting the grid and lamps, is pivotally mounted to the trap 10. The wire fence 90 includes a plurality of spaced wires 91 that extend the length of the trap 10 between the end caps 22, 23. A plurality of cross wires 92 hold the wires 91 in position. Tabs 93 are formed in the end caps 22, 23 and the tabs 93 have an opening drilled therein to accept the wire 91*a*, which is slightly larger than the other wires 91 to allow it to enter the opening of tab 93. A clamp 94 having an opening, is positioned on the end caps 22, 23 and is sized to have a friction fit with the last wire on the fence 90. That is, as the wire fence 90 swings shut, the last wire will be positioned over the clamps 94 and the clamps 94 have an opening slightly smaller than the diameter of the wire so that the wire may be press fit into the clamp, which flexes, and then retains the wire fence 90 in position. Such clamps 94 are well known in the art. As can be seen in FIG. 4, a section 90*b* of the wire fence 90, which is proximate one side is fixed and does not swing open. The wire fence 90, when it swings open, provides access to the grid 40 and lights 44. A safety switch 95 is incorporated into the wire fence 90. The safety switch 95 may be any safety switch which is typically used in the art. A switch 95 may be placed in the end cap 23 and then a fence segment is formed 90 degrees to the other wires. Then, as the fence 90 is closed, the segment will contact the switch 95 and allow power to the circuit as shown in FIG. 7.

The present invention utilizes a grid tester 96. The tester 96 has a contact 97 that is positioned so that its end is proximate the end of the grid wires 41. However, in the first position, the contact 97 is not contacting the grid wire 41. The contact 97 is connected to an insulated plunger 98. Depression of the plunger 98 moves the contact 97 into contact with the wire 41 and will cause the light 99 to light if there is power being supplied to the grid. It is contemplated that other suitable mechanisms may be used to form the grid tester 96. A lever or any moveable contact to move from a first, non-engaging position to a second, engaging position may be utilized. Further, the light 99 may be any suitable type of indicator such as a light, buzzer, etc.

Connected to the back wall member 21 are two mounting plates 31, 32. The mounting plates are L-shaped and have a first leg 31*a*, 32*a* operatively connected to a mounting surface 31*b*, 32*b*. Two key hole slots 33, 34 are formed in the mounting surface 31*b*, 32*b* for hanging the trap 10 in a vertical orientation. Two key slots 35, 36 are formed in the mounting surface 31*b*, 32*b* for hanging the trap 10 in a horizontal configuration. Suitable mounting posts, not shown, are placed in a wall and then the mounting posts are placed in a larger portion of the key hole slot and the trap 10 is then lowered so that the mounting posts will go into the narrower portion of the key hole slot and hold the trap 10 in position.

Two end trays 70, 80 may be utilized with the present invention. The first end tray 70 is a collection tray shaped and configured to fit on top of the end caps 22, 23. The tray 70 is in the general shape of an open top rectangular parallelepiped with two slots 70*a* formed therein. The slots 70*a* are sized and configured to be positioned around the lights 44. The end tray 70 has a width such that the slots 29, 30 are not covered. Therefore, the end trays 70 may be utilized when the side trays 50 are used.

If the side trays 50 are not used, then the second end plate 80, may be utilized. The second end tray 80 is also in the shape of an open top rectangular parallelepiped with two slots 80*a* formed therein for the lights 44. The tray 80 is the same size and shape as the tray 70 except that it is wider so that the tray covers the slots 29, 30. Therefore, if the side trays 50 are not used, the end trays 80 will provide for a more complete cover for the end caps 22, 23. When side tray 50 is used, the tray 70 is a complete cover over the end caps 22, 23 between the trays 50.

Referring now to FIG. 7, the electrical schematic of the insect trap 10 is shown. A power cord 62 is connected to a suitable source of 120 VAC. When the wire fence 90 is closed, the switch 95 is in a closed position, thereby allowing power to go to the rest of the circuit. A switch 63 is used to turn on and off the grid transformer 64. The switch 63 may be any suitable switch. As shown in FIG. 1, the switch 63 is an indented keyed switch, although other suitable switches may be utilized. A keyed switch is preferable to prevent the inadvertent turning on and off of the grid transformer 64. The grid transformer 64 may be any suitable grid transformer such as a 4.5 KV, 9.8 milliamps transformer. The transformer 64 is connected to the wires 41 of the grid 40 to provide the electrocuting power for electrocuting the flying insects that contact the wires 41. The fluorescent lamp ballast 65 is connected to the cord 62 through the switch 95. The ballast 65 and grid transformer 64 may be positioned in the cavity 27. The lamp ballast 65 is connected to the two lamps 44 through lamp sockets (not shown). The grid tester 96 has the contact 97 positioned proximate the grid wires 41. The contact 97 is connected to the lamp 99 by a resistor 66. To protect the lamp 99 when using the present transformer 64, it is necessary to have a resistor 66 of at least 459,184 ohms.

Figure 2:
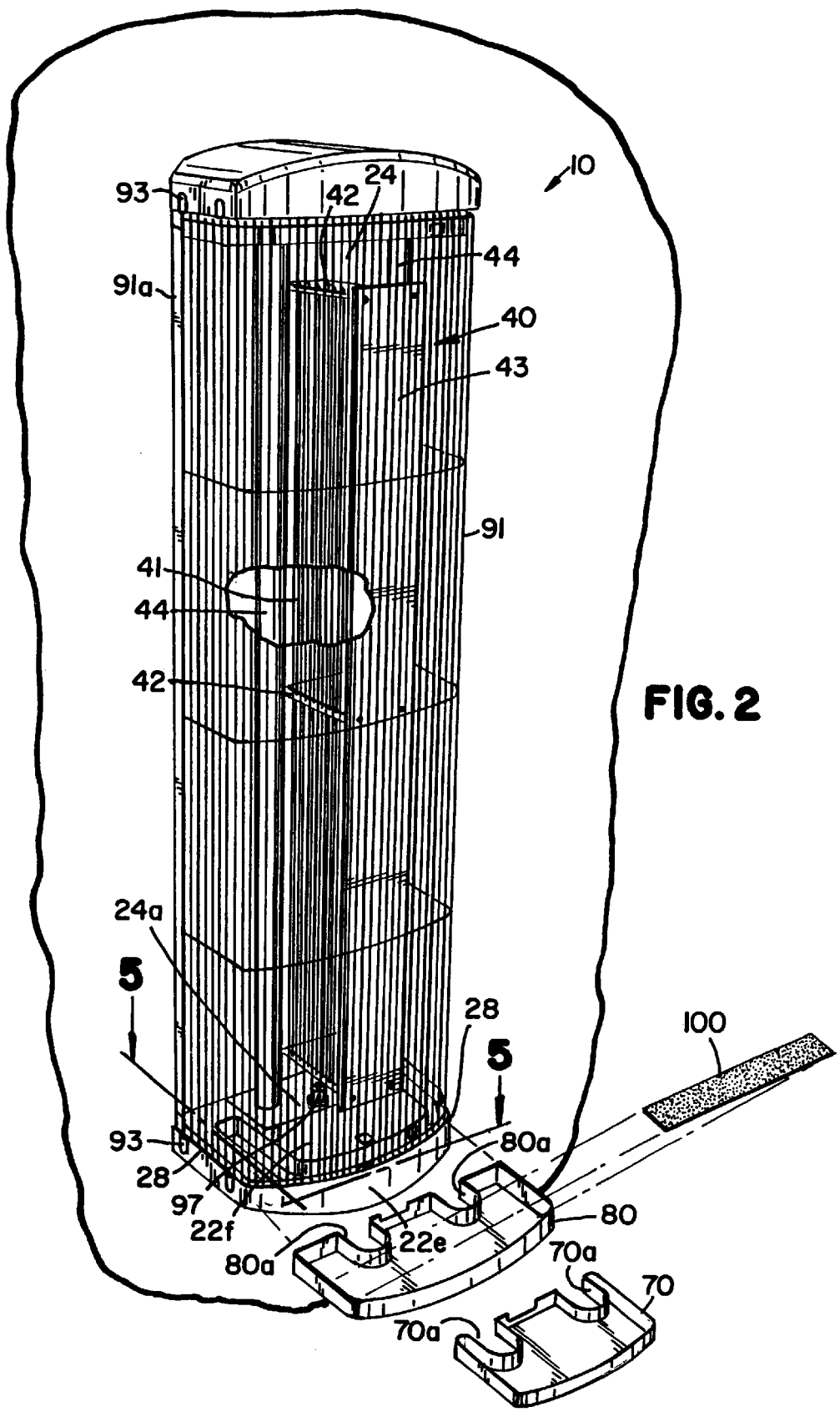
FIG. 2 is a perspective view of the insect trap shown in FIG. 1, with portions exploded away, in a vertical position.

In use, the insect trap 10 may be used in an electrocuting mode or a non-electrocuting mode. A non-electrocuting mode refers to not using the transformer 64 and grid 40, but still utilizes the lamps 44. In using the trap 10 in the electrocuting mode, the keyed switch 63 would be turned on. The trap 10 may be then mounted either horizontally or vertically. If mounted vertically, as shown in FIG. 2, end tray 80 would be utilized if the trays 50 were not used. If the trays 50 were used, then end tray 70 would be used. The end trays 70, 80 are easily removable to dispose of any insects that were killed by the electrical wires 41. Further, end tray 80 may utilize an adhesive sheet 100 that is sized to fit in the tray 80. Suitable fasteners (not shown) may be used to secure the sheet 100. Alternately, the sheet 80 may have an adhesive on its underside to stick to the tray 80. Tray 70 may also use an adhesive sheet. As previously stated, there is some concern with the fragment parts that occur when an insect bursts after it contacts the electrical wires 41. Therefore, the trays 50 may be used as a shield, thereby only leaving the one side, or front open. There, the cover 43 would even deflect some of the fragments thereby making this trap 10 a more sanitary trap. The insects would still have access through the openings between the wires 41 on the front side. The trays 50 may be used either with or without an adhesive paper 60 when in the electrocuting mode.

It can therefore be seen that the insect trap 10 is very versatile and may be utilized as either an electrocuting trap or a non-electrocuting trap. Further, the trap 10 may be used in a horizontal or vertical position. Still further, any number of combinations of trays 50, 70, 80, all with or without adhesive sheets, may be utilized. For instance, in the vertical electrocuting mode, a tray 80 may be used to collect electrocuted insects. Alternately, if elongate trays 50 are used, tray 80 would be used as a collection tray. They trays 50 would be utilized to protect the environment from the bursting insects as they are electrocuted. In addition, the cover 43 protects the environment from the bursting insects and directs more of the insect parts to the collection tray 70 or collection tray 80. Adhesive sheets may or may not be used with any of the trays 50, 70, 80.

In the electrocuting mode, when the trap 10 is horizontal, the end trays typically are not used. There would be on tray 50 that would be used on the bottom as a collection tray. If it was desired to protect the environment from bursting insects from the electrocution, a top tray 50 would be used.

When used as a non-electrocuting trap, the lamps, by the present design, are used as an attractant and the keyed switch only turns off the transformer. In the vertical mode, just the tray 80 could be used with an adhesive sheet 100. Alternately, the end tray 70, with or without an adhesive sheet, may be utilized in conjunction with zero, one or two of the tray 50 with adhesive sheets 60.

When the insect trap is used in the non-electrocuting mode and horizontal, typically the bottom of the trap would have the tray 50 with the adhesive sheet 60. It is of course understood that the end trays 70, with an adhesive sheet, may also be used when horizontal as well as the possible use of a top tray 50 with an adhesive sheet.

The many combinations with the present design make the insect trap 10 very versatile in a variety of combinations.

The above specification, examples and data provide a complete description of the manufacture and use of the composition of the invention. Since many embodiments of the invention can be made without departing from the spirit and scope of the invention, the invention resides in the claims hereinafter appended.

I claim:
1. An insect trap, comprising:
 a) a housing;
 b) an insect electrocuting grid positioned in the housing;
 c) a grid transformer operatively connected to the insect electrocuting grid;
 d) a power cord for connecting the trap to a source of power, the grid transformer operatively connected to the power cord;
 e) a lamp, positioned in the housing and operatively connected to the power cord;
 f) an integrated grid tester comprising:
  i) a contact moveable between a first, unengaged position and a second, engaged position, wherein when in the engaged position, the contact touches the grid;
  ii) an indicator operatively connected to the contact, wherein when the contact is in the engaged position, the indicator signals the grid is operational.

2. The insect trap of claim 1, wherein the indicator is a lamp and a resistor is connected to the lamp.

3. The trap of claim 1, further comprising the housing having a back wall, a first mounting mechanism for mounting the insect trap in a horizontal configuration and a second mounting mechanism for mounting the insect trap in a vertical orientation.

4. The trap of claim 1, wherein the housing comprises:
 a) a back wall, having a first edge and a second edge, operatively connected to a first end member and a second end member;
 b) the insect electrocuting grid connected to the back wall;
 c) a first bursting insect shield positioned between the first and second members proximate the first edge; and
 d) a second bursting insect shield positioned between the first and second end members proximate the second edge, wherein insect access to the electrocuting grid is between the shields and the shields reduce the transmission of insect fragments after electrocution.

5. The trap of claim 4, further comprising a grid cover, the grid cover extending over the grid, wherein a third bursting insect shield is formed further reducing transmission of insect fragments after electrocution.

6. The trap of claim 1, further comprising a second insect collection tray and both of said first and second trays are elongate and protect surrounding environment on first and second sides from bursting insects that have been electrocuted.

7. The trap of claim 6, further comprising a grid cover, the grid cover extending over the grid wherein a-third side is protected from bursting insects that have been electrocuted.

8. A dual mode insect trap, comprising:
 a) a housing;
 b) an insect electrocuting grid positioned in the housing;
 c) a grid transformer operatively connected to the insect electrocuting grid;
 d) a power cord for connecting the trap to a source of power, the grid transformer operatively connected to the power cord;
 e) a lamp, positioned in the housing and operatively connected to the power cord;
 f) a first insect collection tray positioned in the housing;
 g) a switch connected between the grid transformer and the source of power, wherein in a first position the power source is connected to the grid and in a second position power is disconnected to the grid, and in both the first and second position the lamp is connected to the power source;
 h) the first insect collection tray adapted and configured to receive an adhesive sheet, wherein the trap is operable as an electrocuting insect trap when the switch is in the first position and a non-electrocuting insect trap when in the second position; and i) an integrated grid tester comprising:
    i) a contact moveable between a first unengaged position and a second engaged position, wherein when in the engaged position, the contact touches the grid;
    ii) an indicator operatively connected to the contact, wherein when the contact is in the engaged position, the indicator signals the grid is operational.

9. The insect trap of claim 8, further comprising the housing having a back wall, a first mounting mechanism for mounting the insect trap in a horizontal configuration and a second mounting mechanism for mounting the insect trap in a vertical orientation.

10. The insect trap of claim 8, wherein the housing comprises:
  a) a back wall, having a first edge and a second edge, operatively connected to a first end member and a second end member;
  b) the insect electrocuting grid connected to the back wall;
  c) a first bursting insect shield positioned between the first and second members proximate the first edge; and
  d) a second bursting insect shield positioned between the first and second end members proximate the second edge, wherein insect access to the electrocuting grid is between the shields and the shields reduce the transmission of insect fragments after electrocution.

11. The insect trap of claim 10, further comprising a grid cover, the grid cover extending over the grid, wherein a third bursting insect shield is formed further reducing transmission of insect fragments after electrocution.

12. The trap of claim 8, further comprising a second insect collection tray and both first and second trays are elongate and protect surrounding environment on first and second sides from bursting insects that have been electrocuted.

13. The trap of claim 12, further comprising a grid cover, the grid cover extending over the grid wherein a third side is protected from bursting insects that have been electrocuted.

* * * * *